June 29, 1937.  E. A. GEMENY  2,085,150
SEWAGE COLLECTOR
Filed Oct. 21, 1935  2 Sheets-Sheet 1

Inventor:
Ernest A. Gemeny.
By: Milo B. Stevens & Co.
Attys.

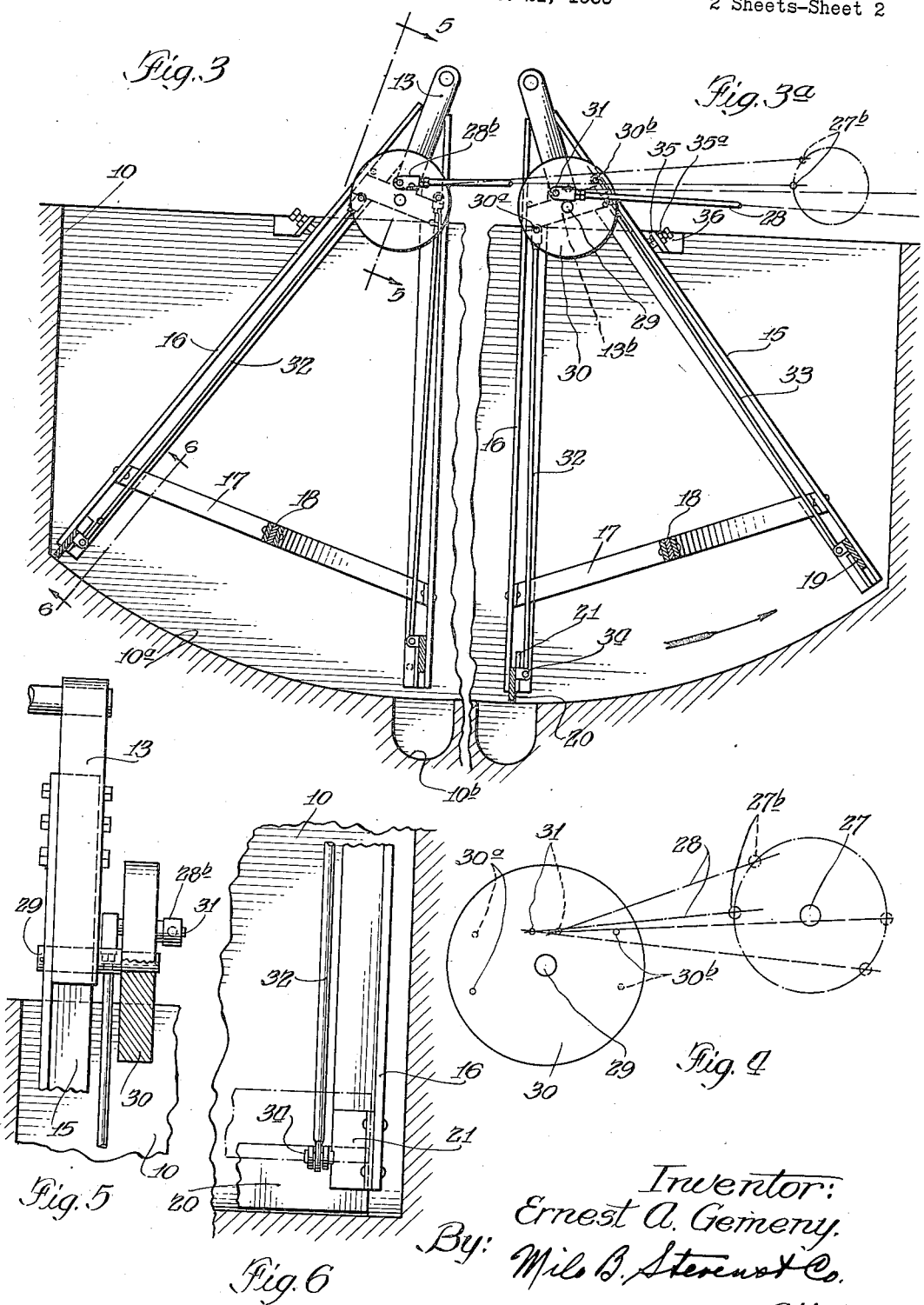

Patented June 29, 1937

2,085,150

UNITED STATES PATENT OFFICE 2,085,150

SEWAGE COLLECTOR

Ernest A. Gemeny, Chicago, Ill.

Application October 21, 1935, Serial No. 46,049

10 Claims. (Cl. 210—3)

My invention relates to means for separating and collecting solid matter suspended in sewage, and my main object is to provide an apparatus for this purpose which is compact and efficient.

A further object of the invention is to design the novel apparatus on lines of simplicity, in order that it may be produced inexpensively and attended without difficulty.

A still further object of the invention is to embody in the novel apparatus a unique mechanical movement conducive to rapid and advantageous disposal of the material being collected.

An important object of the invention is to operate the novel collector by standard or conventional power means, and without the need of special or complicated driving machinery.

With the above objects in view, and any others which may suggest themselves from the description to follow, a better understanding of the invention may be had by reference to the accompanying drawings, in which—

Figures 3 and 3a are enlarged portions of Figure 2 showing the collecting mechanism in different positions.

Figures 1, 2:
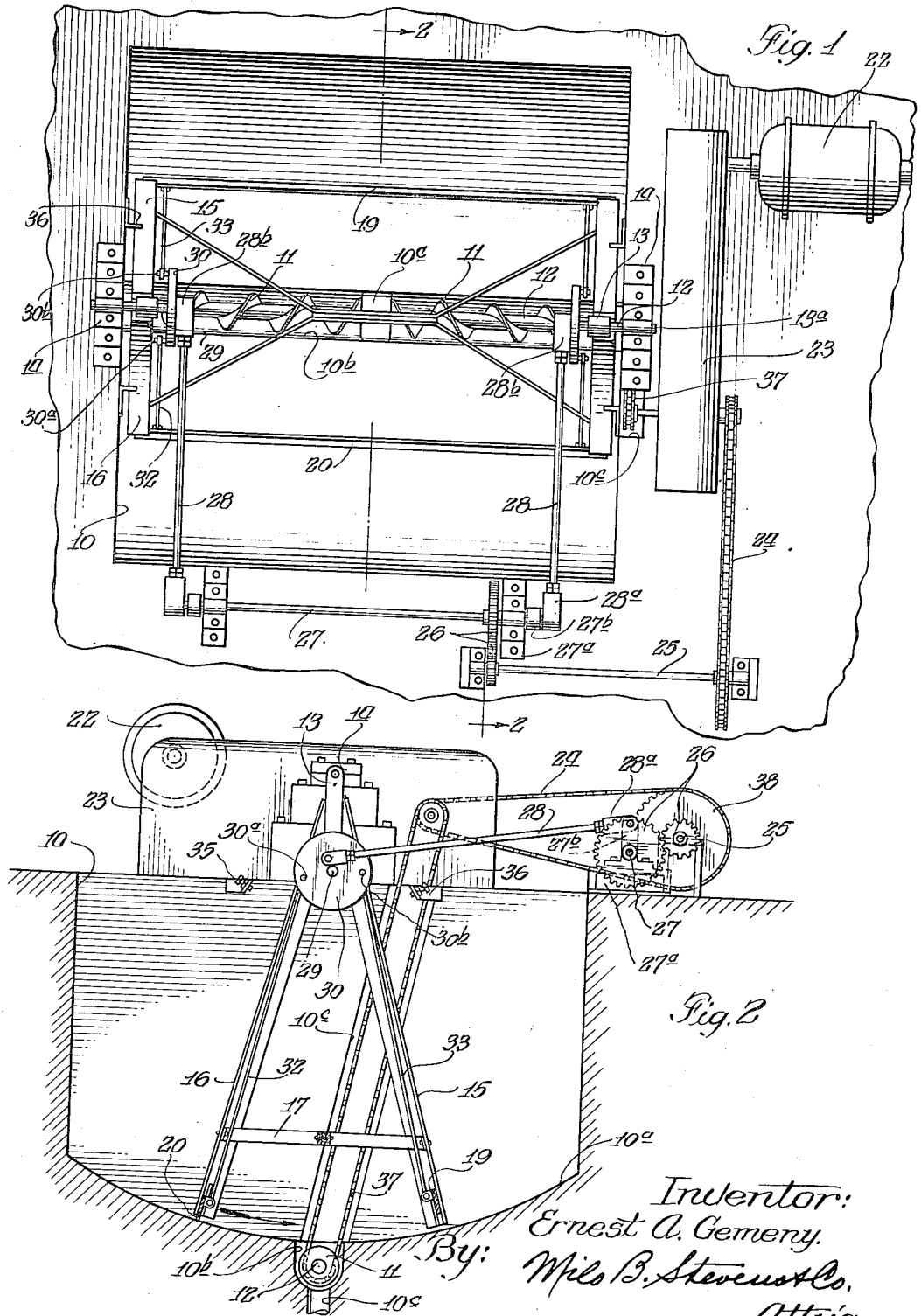
Figure 1 is a plan view of the novel sewage collector.
Figure 2 is a section on the line 2—2 of Figure 1.

Figure 4 is a diagram showing the important positions of movements governing the action of the collector; and Figures 5 and 6 are, respectively, sections on the lines 5—5 and 6—6 of Figure 3.

While various developments have been made in the line of sewage collection or sedimentation equipment, it is significant that most installations are either complicated or require a considerable area to accomplish their purpose. Also, the results I have noted in the particular field lack efficiency to a greater or less degree through the fact that their function is either involved or difficult of accomplishment, requiring more power and attention than the results warrant. I have therefore departed from the deficiencies of the past by designing an apparatus which accomplishes the above objects to their fullest extent.

In the construction of the novel apparatus, specific reference to the drawings indicates the receptacle or pit containing the sewage at 10, the bottom of the pit being rounded from end to end as indicated at 10a. The center portion of the bottom is therefore the lowest, and accumulates material in the direction of a transverse trough 10b sunken from the bottom of the pit. As indicated in Figures 1 and 2, a set of oppositely-wound conveyor screws 11 are disposed in the trough, the screws being fixed on a shaft 12. These screws are so wound that with the shaft 12 driven in a certain direction the feed of the material of the trough will be toward the center thereof, where a discharge outlet 10d is provided.

While the solid matter contained or suspended in the liquid slowly settles on the floor of the pit, the slope of the latter is in itself insufficient to move the sediment toward the center for deposit into the trough 10b. I have therefore designed a power mechanism to induce such movement and so expedite the separation and collection of the solid matter.

As illustrated, a sweep member 13 of skeleton construction is suspended in the pit, the ends of the member having trunnions 13a journaled in bearings 14 adjoining the sides of the pit. The sweep member is free to swing from one end of the pit to the other, as indicated by its positions in Figures 3 and 3a, it being of a radius corresponding to the curvature of the pit bottom 10a.

The sweep member 13 is composed of two transverse frames 15 and 16 spread at an angle from the top of the member and composed of terminal angle bars connected by cross spacers 17 and a medial brace 18, the angle bars being secured to base portions 13b of the member 13.

The frames 15 and 16 carry scraper bars 19 and 20, respectively, at the bottom, each scraper bar being slidable along the frame within guide lugs 21 carried by the corresponding angle bars. In order that the sweep member may be instrumental in clearing the bottom of the pit, it is my intention that the scraper bar 20 be down and almost in contact with the pit floor as indicated in Figure 3 when the sweep member swings from the left end of the pit to the right hand end thereof, the scraper bar 19 being in the raised position shown; and that the scraper bars reverse their positions on the return stroke of the sweep member. This action, it will be seen, will move material on both sides of the trough 10b toward the center in alternate sequence, so that with a power means imparting a continuous oscillatory movement to the sweep member the sediment in the pit will be removed as it falls, collecting in the trough 10b for discharge.

The oscillatory movement of the sweep member 13 is imparted by a drive originating with an electric motor 22 or other type of power plant, the motor being geared down by the interposition of a conventional speed reducer 23—whose details it is not necessary to illustrate—whereby to result in a chain drive 24 to an external shaft 25, from which a reduction drive 26 leads the power to a final shaft 27 journaled in bearings 27a situated adjacent to one end of the pit 10. The shaft 27 carries cranks 27b receiving the outer heads 28a of a pair of pitmen 28 which extend in the direction of the sweep members 13.

Each base portion 13b of the corresponding sweep member 13 carries an inward pin 29 on which is freely centered a disc 30. The corresponding head 28b of each pitman 28 freely receives a pin 31 projecting from the face of the disc 30, and to all intents and purposes this is a connection by each pitman with the particular side of the sweep member, so that the rotation of the shaft 27 procures the oscillatory movement of the sweep member previously referred to.

The disc 30 at each end of the sweep member 13 has small outward pins 30a and 30b on opposite sides of the center pin 29, these pins freely receiving the upper heads of rods 32 and 33 which make offset pivotal connections at 34 with the respective scraper bars 20 and 19. These are ordinarily slidable between the corresponding frame members and guide lugs 21, but have a limited tendency to twist and therefore bind on the upward pull of the rods, due to the lateral positions of the pivots 34. As the sweep member is propelled in one or the other direction through the pit, the binding action aforesaid resists the rocking of the disc relative to the sweep member, especially as the radial distance of the pitman pin 31 from the disc center pin 29 is quite short and presents a disadvantageous leverage to the pitman for the upward pull of the scraper bars. Generally, therefore the drive to the sweep member may be considered as not affecting the positions of the scraper bars.

However, when the sweep member attains the end of each stroke, it is stopped by limiting screws 35 secured in suitable fixtures 36 on the side walls of the pit, lock nuts 35a being provided to secure the screws 35 at any point in their adjustment. Now, assuming that the sweep member is moving from right to left, and that the scraper bar 19 is down, it follows that the scraper bar 20 is up and out of service. However, when the sweep member meets the left-hand limiting screw 35 and can go no further, the continued urge of the pitman 28 causes the disc 30 to be rotated in a counterclockwise direction, whereby to overcome the resistance of the scraper bar 19, so that the latter is raised while the scraper bar 20 is lowered, as shown in Fig. 3. On the return toward the right the scraper bar 20 functions until the sweep member is about to strike the right-hand limiting screw 35, as indicated in Figure 3a. When the screw is struck a reversal of the scraper bars occurs by the same action as in the previous instance. The action just described is indicated in both positions by full and dotted lines in Figure 4 and at the top of Figure 3a.

It is apparent that the stroke of the pitmen 28 is so calculated as to procure the scraper bar reversals just as each stroke ends and when the cranks by their horizontal positions exert the most power. Therefore the resistance offered by the change does not impose a strain on the drive, and no appreciable increase in the size of the power plant is required because of such resistance. Besides, the drive for the sweep member is very slow, both to allow sufficient sediment to settle and not to agitate the same during its descent.

It is evident from the above description that I have provided a simple and practical mechanism for propelling and shifting the scraper bars as described, such mechanism being compactly grouped as a unit at each end of the sweep member 13. Also, the shifting rods for the scraper bars are within the corner angle bars of the sweep member, leaving the latter so open as to offer no appreciable resistance by its passage through the pit contents. For this additional reason, as well as the considerable gear reduction to secure the slow motion of the sweep member, a relatively small power plant will suffice to drive the same.

As it is necessary to operate the discharge screw 11 concurrently with the sweep member, I provide a chain drive 37 from the speed reducer thereto, as clearly shown in Figure 2, the pit being recessed in its sides as indicated at 10c to accommodate such chain drive in a position to clear the sweep member. With the sections of the screw oppositely wound, the material can be moved more quickly to the central point of discharge than in the case of a singly wound screw, with the outlet at one side of the pit.

While I have described the novel action mechanism in connection with a sewage pit or tank, it is equally applicable to any installation where it is desirable to collect and discharge material falling to or settling upon the bottom of a tank or vessel. Also, it is conceivable that various slight changes or refinements may be made in the apparatus to adapt it to different requirements, and I consider all such changes and refinements as coming within the scope and spirit of the invention as covered in the appended claims.

I claim:—

1. Sediment collecting apparatus comprising in combination, a settling receptacle having a curved bottom, a sweep frame oscillatable in the receptacle, the lower end of the sweep frame being close to and following the curvature of the receptacle bottom during travel, a stud shaft projecting laterally from said sweep frame, a disc rotatably mounted on said shaft, driving means having an eccentric connection with said disc for oscillating said sweep frame, scraper bars slidably mounted in the lower end of said frame for reciprocation therein toward and away from the receptacle bottom, link means connecting said respective scraper bars to diametrically oppose points of said disc, stop means carried by the receptacle and disposed at each limit of the sweep frame stroke, and said scraper bars having a frictional engagement with said frame whereby on engagement of the frame with a stop member the said disc is caused to shift rotatably on its shaft for alternately moving said scraper bars toward and away from the receptacle bottom during oscillation of the frame.

2. The structure of claim 1, said eccentric connection to the disc being midway between its said diametrically opposed points.

3. In a sediment collecting apparatus, scraper means comprising a sweep frame pivotally mounted on a support for oscillation thereon, a stud shaft projecting laterally from said frame adjacent its pivotal point, a disc rotatably mounted on said shaft, driving means eccentrically connected to said disc for oscillating said frame through its connection with said disc, a scraper bar slidably mounted in said frame and having a frictional drag resistance with respect thereto, stop means associated with said support for engaging said frame to define its limits of oscillation, and means operatively connecting said disc and scraper bar whereby said bar is reciprocatively shifted on said frame by the continued rotation of said disc at each limit of oscillation of the frame.

4. Sediment collecting apparatus comprising in combination, a settling receptacle having its bottom sunken from the ends to the center in an arcuate course, a pair of scrapers pivoted at the axis of curvature of said arcuate course and extending toward the same at points spaced longitudinally of the tank, the scrapers being each oscillatable about the said axis of curvature between the tank-end proximate thereto and said center, means connecting the scrapers for joint oscillation, and means operative to dispose each scraper along the tank bottom on its inward movement and raised therefrom on its outward movement.

5. Sediment collecting apparatus comprising in combination, a settling receptacle having a discharge opening in its bottom, a sweep frame pivotally mounted at the top of said receptacle to oscillate therein, the speed frame depending to a point spaced from the receptacle bottom, a sediment scraper reciprocable along the sweep frame toward and from said bottom, drive means to oscillate the sweep frame, and an operative connection between the latter and said drive means to dispose the scraper along said bottom during sweep frame strokes toward said discharge opening and raised from the bottom during sweep strokes departing from the opening.

6. Sediment collecting apparatus comprising in combination, a settling receptacle having a bottom descending curvedly to a zone of discharge, a sweep frame pivotally mounted at the top of said receptacle for oscillation and having its pivot disposed axially with respect to the curve of the receptacle bottom, the sweep frame depending to a point spaced from the receptacle bottom, a sediment scraper reciprocable along the sweep frame toward and from said bottom, drive means to oscillate the sweep frame, and an operative connection between the latter and said drive means to dispose the scraper close to said bottom on the down swing of the sweep frame and raised from the same on the upswing thereof.

7. Sediment collecting apparatus comprising, in combination, a settling receptacle, a sweep frame pivotally mounted at the top of the receptacle to oscillate therein and depending with longitudinally-spread arms into the receptacle to points spaced from the bottom thereof, sediment scrapers movable along said arms toward and from the receptacle bottom, and means operative to dispose the scraper of one arm close to said bottom and that of the other arm raised therefrom during strokes of the sweep frame in one direction and to dispose the scrapers in reverse relation during opposite strokes of the sweep frame.

8. Sediment collecting apparatus comprising in combination, a settling receptacle having a bottom curvedly sunken between its ends, a sweep frame pivotally mounted at the top of said receptacle and midway between said ends for oscillation and having its pivot disposed axially with respect to the curve of the receptacle bottom, the sweep frame depending with arms spread longitudinally and spaced at their lower ends approximately half the length of the receptacle, sediment scrapers movable along said lower ends toward and from the receptacle bottom, and means operative to dispose the scraper of the rear arm close to said bottom and that of the front arm raised from the same during the strokes of the sweep frame.

9. Sediment collecting apparatus comprising in combination, a settling receptacle having a sediment discharge opening in its bottom, a sweep frame pivotally mounted at the top of said receptacle to oscillate therein and formed with spread arms extending downwardly in the receptacle with their lower ends spaced above the receptacle bottom an equal distance, guides on the lower ends of said arms, a scraper bar on each said arms and slidable in its guide for reciprocation along its arm, a driven element carried by said sweep frame and shiftable thereon, a driving element connected with said driven element to oscillate said sweep frame, and means operatively connecting said driven element and the scraper bars whereby to reciprocate said bars alternately to approach and recede from the receptacle bottom during oscillation of said sweep frame.

10. In a sediment collecting apparatus, scraper means comprising a sweep frame pivotally mounted in a support for oscillation thereon, a stud shaft projecting laterally from said frame adjacent its pivotal point, a disc rotatably mounted on said shaft, driving means eccentrically connected to said disc for oscillating the frame through its connection with said disc, a scraper bar slidably mounted in said frame and having a lateral offset, a link connecting the latter with an eccentric point in said disc, said offset causing the scraper to bind in the frame from the rotative effort of the disc in response to said drive means, and stop means associated with said support for engaging the frame to define its limits of oscillation, the continued rotation of said disc at each oscillation limit of the frame inducing the link to overcome the binding resistance of the scraper bar with the effect of shifting such bar along the frame.

ERNEST A. GEMENY.